United States Patent
Bjornholt et al.

(10) Patent No.: US 6,466,157 B1
(45) Date of Patent: Oct. 15, 2002

(54) ELECTRONIC FENCE USING HIGH-RESOLUTION MILLIMETER-WAVE RADAR IN CONJUNCTION WITH MULTIPLE PASSIVE REFLECTORS

(75) Inventors: John Bjornholt, Fountain Hills, AZ (US); Gary Hamman, Scottsdale, AZ (US); Steve Miller, Scottsdale, AZ (US)

(73) Assignee: Sensor Technologies & Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/682,068

(22) Filed: Jul. 17, 2001

(51) Int. Cl.⁷ .................... G01S 13/00; H01Q 15/00; G08B 13/08
(52) U.S. Cl. .............. 342/28; 340/545.3; 340/552; 340/564; 342/5; 342/7
(58) Field of Search ............... 340/545.3, 552, 340/564; 342/28, 5, 7

(56) References Cited

U.S. PATENT DOCUMENTS

| | | | |
|---|---|---|---|
| 4,079,361 A | * 3/1978 | Woode | |
| 4,132,988 A | 1/1979 | Blacksmith et al. | |
| 4,189,233 A | * 2/1980 | Hurt et al. | |
| 4,219,802 A | * 8/1980 | Ceseri | |
| 4,239,961 A | * 12/1980 | Lasar | |
| 4,893,005 A | * 1/1990 | Stiebel | |
| 5,202,742 A | * 4/1993 | Frank et al. | |
| 5,208,601 A | * 5/1993 | Hart | 342/33 |
| 5,422,645 A | * 6/1995 | Nettleton et al. | 342/45 |
| 5,680,120 A | * 10/1997 | Tilleman | |
| 5,819,164 A | * 10/1998 | Sun et al. | 342/6 |
| 5,910,929 A | * 6/1999 | McConnell et al. | 367/96 |

* cited by examiner

Primary Examiner—Stephen C. Buczinski
(74) Attorney, Agent, or Firm—Michael Dryja; Don Carnegie

(57) ABSTRACT

An apparatus for the detection of any intruder passing through an electronic fence is disclosed. The electronic fence is formed by a millimeter wave radar positioned at one end of the fence and a plurality of reflectors placed along the floor of the fence as well as on a structure at its far end. The fence is formed of a plurality of electromagnetic beams traversing between the radar antenna or antennas and each of the reflectors. A sufficient number of beams inhabit the fence volume to make traversing the fence by an intruder without detection essentially impossible. The radar reflection from the intruder's person is used to report the location of an intruder attempting to traverse the electronic fence near the radar end and is the secondary means of detection at greater ranges where breaking of one or more electromagnetic beams constitutes the primary means of detection.

11 Claims, 11 Drawing Sheets

ELECTRONIC FENCE USING HIGH-RESOLUTION MILLIMETER-WAVE RADAR IN CONJUNCTION WITH MULTIPLE PASSIVE REFLECTORS

BACKGROUND OF INVENTION

The present invention relates in general to perimeter monitoring and intrusion detection, and in particular to the detection of intruders by the interruption of beams traversing between a millimeter wave radar and associated apparatus.

The possibility of industrial espionage, terrorist activity or material theft result in the necessity to protect various high value assets, whether they are owned by the military, government, utility companies, corporations or private entities. High value assets are frequently protected by wire fences or solid walls. However, these means of protection can be surmounted or penetrated by a determined intruder. An example of an asset that may need protection is an aircraft away from its home base and parked on the tarmac with only airport perimeter fencing for security.

A desirable method of protecting valuable assets is the establishment of an "electronic fence" that includes a volume or volumes wherein any intruder entering any of these volumes will be detected. These volumes should have clearly defined limits to prevent false alarms due to individuals, vehicles, and so on, transmitting nearby but not through the detection volume. FIG. 1 illustrates such an electronic fence arrangement established to protect a high value asset 1. The high value asset is shown parked in an open storage area formed by buildings 2 and a perimeter fence 3.

When this level of security is deemed insufficient, an electronic fence can be formed by the present invention to provide the needed detection of any intruder that has gotten inside the perimeter fence. In the arrangement of FIG. 1, the electronic fence has segments 4 and 5. If the asset should be located in an open area such as the aircraft example above, the fence can be deployed with a sufficient number of segments to completely surround the asset.

Prior art use of fences for intruder detection have employed micrometer, millimeter or infrared wavelengths in the electromagnetic spectrum. Various methods of generating beams or electronic fences as well as methods of detection have been used.

Prior art infrared intrusion detectors use such means as the formation of a beam or beams traversing the detection area with the breaking of the beam by the passage of an intruder initiating a detection, or the reflection of the beam off the intruder back to a receiver as a means of detection. Still another prior art method comprises a at passive system that detects the difference in temperature between the ambient environment and the intruder. The usefulness of the infrared class of prior art is limited by atmospheric conditions including heavy rain and fog that may interrupt a beam, and by the growing availability of infrared viewing equipment that may make infrared beams visible to a well-equipped intruder.

Examples of prior art operating in the microwave and millimeter wave region are capable of generating confined beams to generate an electronic fence. Some place a transmitter at one end of the fence volume and a receiver at the other to form a beam or detection volume between the two. The patent Blacksmith, et al., U.S. Pat. No. 4,132,988, issued on Jan. 2, 1979, uses this configuration with a plurality of passive reflectors to surround a rectangular area and to place the receiver near the transmitter. The passive reflectors are used to change the direction of propagation of the beam, typically by 90 degrees, several times to surround the high value asset and return the beam to the transmitter/receiver location. Interruption, or breaking, of the beam initiates an alarm. In this and similar systems a single beam is used with a cross section defined by the directivity of the antennas, and dimensions of the passive reflectors. An astute intruder could devise means to go under or over the beam and thus avoid detection.

Other prior art sensors based on radar concepts generate beams confined in azimuth and elevation and seek to detect an intruder within the thusly-defined fence volume by ranging on the radar return from the intruder. These sensors require significantly greater emitted energy than beam breaker systems.

What is needed is an improved intrusion detection method and apparatus that generates complete coverage from the surface up to a selected height and along the entire length of the electronic fence to greatly minimize the probability of an intruder traversing the fence by proceeding without being detected over or under the beam or beams that comprise the fence. The intrusion detection apparatus should be easily transportable, consume a minimum of prime power, emit a minimum of electromagnetic energy, have a high probability of detection of any intruder traversing the electronic fence, and have a low false alarm rate for any entity near the fence. For these and other reasons, there is a need for the present invention.

SUMMARY OF INVENTION

The invention relates to an electronic fence that uses high-resolution millimeter-wave radar in conjunction with multiple passive reflectors. The invention provides a new and improved method for the detection of any intruder attempting to traverse a volume defined as an electronic fence, and the apparatus for the implementation of this fence. One advantage of the present invention is that both radar returns from intruders and a plurality of electromagnetic beams operating in the millimeter wave region of the spectrum are used to generate the electronic fence. At these wavelengths emitted energy is confined to well defined beams formed by reasonably sized antennas.

Another advantage of the invention is that the radar reflection is used to report the location of any intrusion for an intruder attempting to traverse the electronic fence near the sensor end, while breaking of one or more electromagnetic beams constitutes the primary means of detection at greater ranges. However, the radar reflections from most intruders at greater ranges are detected and used to report the distance from the sensor structure to the intruder location. A further advantage of the invention is that a sufficient number of beams inhabit the fence volume from a point a short distance away from the sensor end to the terminus end to make traversing the fence by an intruder without detection through this region essentially impossible. This is even if the intruder might attempt such detection avoiding methods as crawling under or jumping over the assumed location of the beams. Still another advantage of the invention is that the continuity of each individual beam is monitored at a sufficiently high rate that an intruder cannot traverse any beam or beams without being detected by beam interruption.

A further advantage of the present invention is that multiple beams are formed by emitting and receiving antennas included in a sensor structure located at one end of the electronic fence. A multiplicity of passive retroreflectors of one form is located periodically along the base of the electronic fence volume and of another form within the reflector structure forming the terminus of the fence. Each antenna functions as both an emitter and a collector of electromagnetic energy within its design beamwidth. The millimeter wave energy proceeding from an antenna to a retroreflector and returning to the antenna along substantially the same path constitutes a beam. The passive retroreflectors are each located at a different actual or apparent range from the emitting and antennas in the sensor structure. A receiving apparatus coupled to the antennas includes means to assess the amplitude of the returned signal from each range separated passive retroreflector.

Another advantage of the invention is that the reflector structure contains a vertically stacked plurality of passive retroreflecting elements, each formed by an antenna coupled to a shorted waveguide of length different from that of the other waveguides. Each antenna and shorted waveguide assembly constitutes a retroreflector at a different apparent range, allowing the sensor structure receiving apparatus to differentiate between the returns from each antenna. This differentiates between the different beams arriving at different locations from base to top of the reflector structure. Other advantages are that all energy-consuming elements are included within the sensor housing, power consumption is minimal due to beam formation by highly efficient passive retroreflectors, and all components are easily transportable and can be deployed rapidly. Still other aspects, embodiment, and advantages of the invention will become apparent by reading the detailed description that follows, and by referencing the accompanying drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
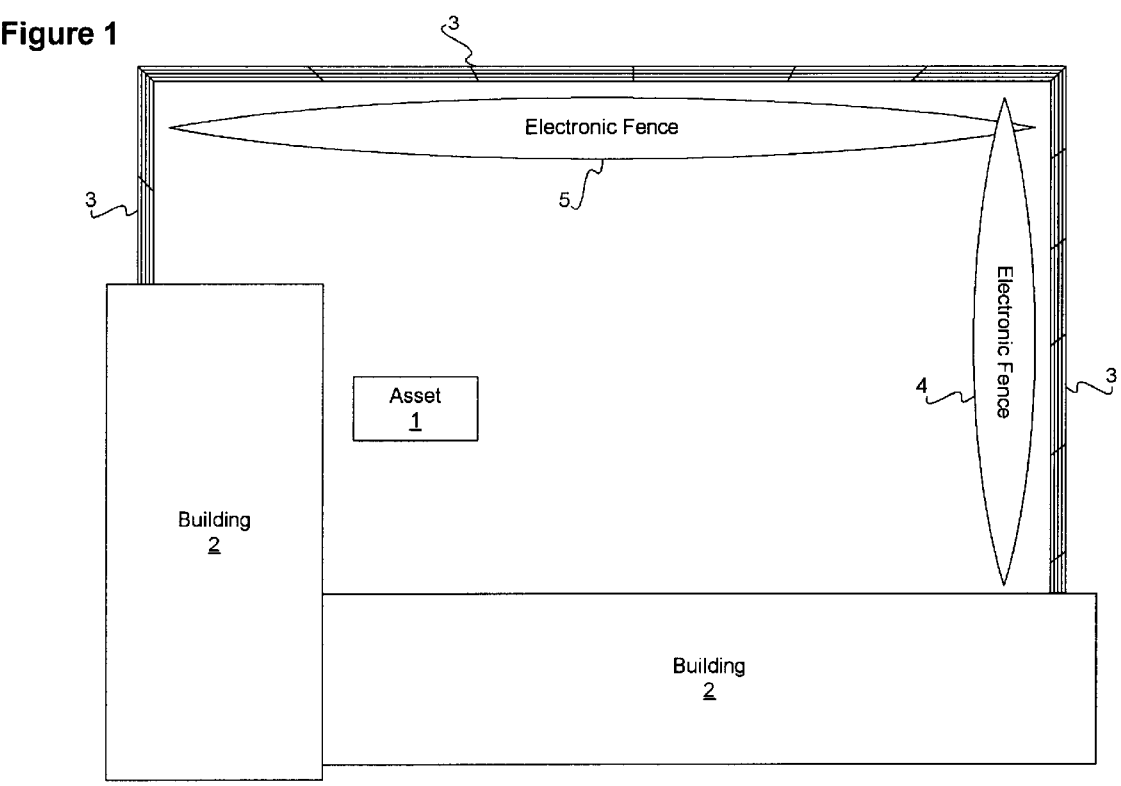
FIG. 1 illustrates an electronic fence arrangement established to protect a high value asset.
Figure 2:
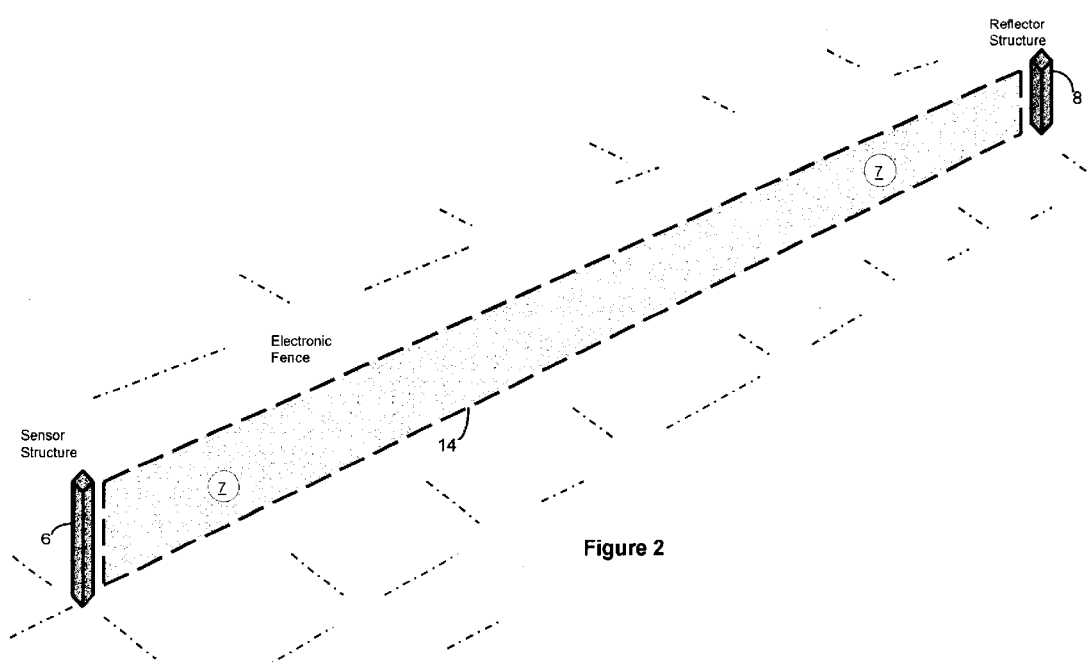
FIG. 2 shows the electronic fence formed by the present invention providing complete coverage from the surface up to a selected height and along the entire length between a sensor structure and a reflector structure at its terminating ends.

FIG. 2 depicts the sensor structure, passive retroreflectors, and reflector structure of one embodiment of the invention. As shown, the invention provides complete coverage from the surface 14 up to a selected height and along the entire length of the electronic fence 7. A sensor structure 6 is shown to the left at one end of the electronic fence 7. The fence is terminated by a reflector structure 8 to the right. Typical dimensions for the electronic fence 7 are 300 meters in length by 3 meters high by less than a half-meter thickness. The major portion of the electronic fence 7 is formed by a plurality of beams emanating from the sensor structure 6 and reflected back to the sensor structure by passive retroreflectors both positioned periodically along surface 14 at the bottom of electronic fence 7 and contained within the reflector structure 8. The interruption of one or more of these beams results in an intrusion alarm being generated. Intruders attempting to traverse the fence immediately in front of the sensor structure 6 are detected by the radar return from their person and any equipment they may be carrying. This form of return is often referred to as a skin return by those skilled in the art.

The sensor structure 6 includes a pillar like housing coupled to a base sufficient to maintain the housing in a vertical position with substantially no movement due to wind or other normally encountered environmental conditions. An alternate installation comprises the coupling of the housing either permanently or temporarily to the side of a building, utility pole, or other available structure. The height of the sensor housing exceeds the height of the electronic fence 7 by at least an amount sufficient to enclose the antenna that forms the upper most beam. In the preferred embodiment, the apparatus within the sensor structure 6 includes a frequency modulated continuous wave (FM-CW) radar operating in the millimeter wave spectrum. The preferred apparatus also includes signal-processing circuitry to process the received signal data and thus determine the ranges to each of a plurality of passive retroreflectors or intruder targets. The preferred apparatus further includes decision logic to determine when an intrusion is occurring, and equipment to relay alarm data to a remote operator. Also included are power sources to supply the energy needs of the equipment.

A plurality of passive retroreflectors of appropriate size for the frequency of operation and having a structure known as a corner reflector to those schooled in the art are placed along the surface forming the bottom of the electronic fence. Each passive retroreflector comprises a three sided pyramid made up of reflecting surfaces shaped as equilateral triangles. The pyramid base is open and positioned to face the emitting antenna on the sensor structure. Incoming electromagnetic energy entering the pyramidal structure is reflected by a surface across the structure to one or both of the other surfaces and then back out of the structure in such a manner that the outgoing energy proceeds parallel but in opposite direction to the incoming energy. Each retroreflector is coupled to a base structure that allows its easy placement and positioning for maximum reflection of incident energy. The incident and reflected millimeter wave energy between the FM-CW radar antenna in the sensor structure 6 and each of these retroreflectors forms a separate beam. The preferred embodiment of the present invention includes passive retroreflectors with a pyramidal internal side dimension of substantially 16.2 centimeters. At an operating frequency of 35.5 Gigahertz, these retroreflectors have an effective radar cross section of some 10 square meters.

Figure 3:
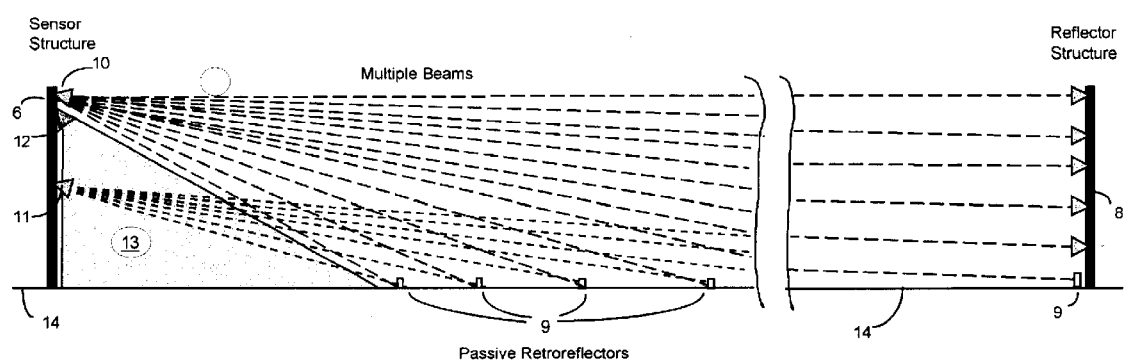
FIG. 3 shows segments of the electronic fence near each of the two structures, and how the fence is formed by structure mounted antennas and passive retroreflectors located along the fence floor.

FIG. 3 provides additional detail regarding electronic fence generation by the preferred embodiment of the present invention. The sensor structure 6, reflector structure 8, and a portion of the plurality of passive retroreflectors 9 are shown with the retroreflectors located along surface 14 forming the bottom of the electronic fence in a straight line between the sensor 6 and reflector 8 structures. The figure is not to scale and shows segments of the electronic fence 7 near each of the two structures. The FM-CW radar antennas, 10, 11, and 12, are located at three different positions on the sensor structure 6. These antennas are switched by the radar to sequentially form three different patterns in keeping with their different beamwidths, locations and purposes.

Antenna 10 is located substantially at 3 meters above surface 14, at the top of the sensor structure and is directed toward the reflector structure 8. The placement of antenna 10 determines the height of the top of the electronic fence 7. This antenna exhibits a beamwidth of some 20 degrees in elevation and 2 degrees in azimuth, measured at the −3 dB points. Antenna 10 provides coverage from the passive retroreflector nearest the sensor structure to, and including, the plurality of antennas coupled to shorted waveguides that form passive retroreflecting elements included within the reflector structure 8. Antenna 11 is located at substantially 1.5 meters above surface 14, its beam is positioned to illuminate passive reflectors from the one located nearest the sensor structure at a range of some 9 meters to passive retroreflectors at ranges greater than 90 meters. The beamwidth characteristics of antenna 11 are similar to that of antenna 10. Antenna 12 is located immediately below antenna 10 and exhibits a broad elevation beamwidth of approximately 70 degrees; its azimuth beamwidth is similar to the other two antennas 10 and 11. Antenna 12 is mounted at an angle so that its beam fills in the region 13 which is not covered by electronic beams formed by antennas 10 and 11 in combination with the passive retroreflectors. In region 13, intruders are detected by the radar return from their person.

Figure 4:
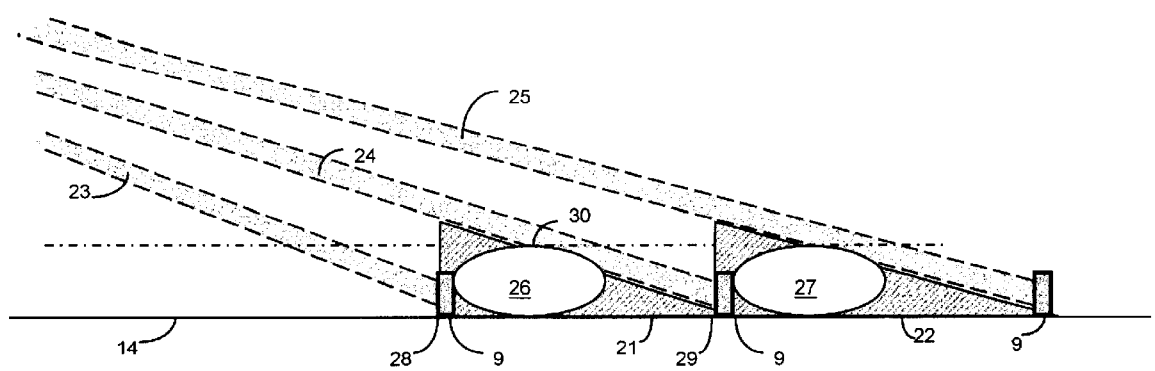
FIGS. 4 and 5 provide detail regarding the preferred spacing of the passive retroreflectors.
Figure 5:
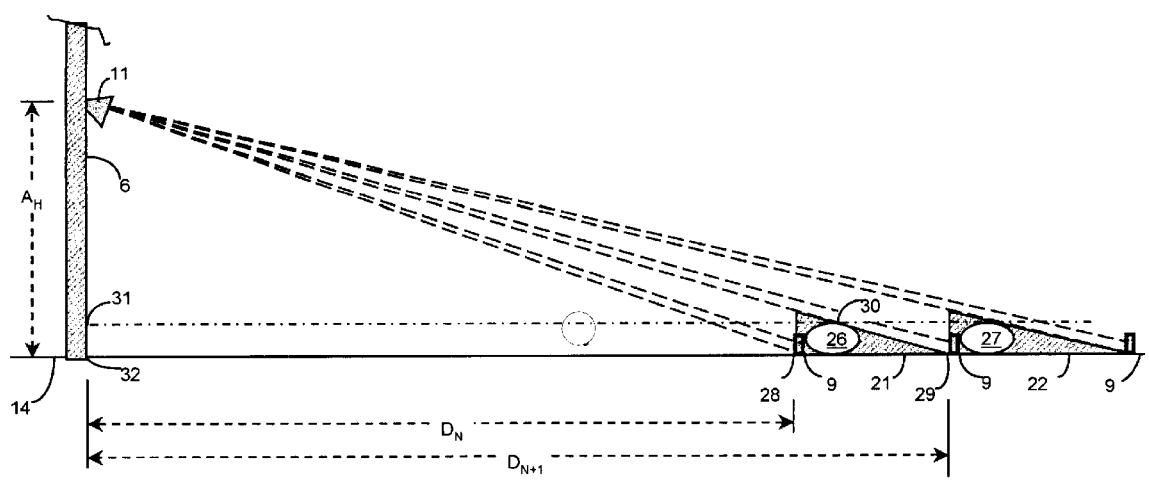

FIG. 4 in conjunction with FIG. 5 illustrates the preferred placement of the passive retroreflectors 9. The intent of the present invention is to provide a multiplicity of beams positioned sufficiently close together that, beyond region 13, it is not possible for an intruder to pass through the beam pattern without detection. For ease of installation and reasonable system cost a minimum number of passive retroreflectors should be used. FIG. 4 shows only the three retroreflectors closest to the sensor structure and depicts volumes 21 and 22 which are contiguous with surface 14 and located between beams 23, 24, and 25. Triangular volumes of a similar nature exist behind each retroreflector except for the retroreflectors coupled to reflector structure 8.

An astute intruder might attempt to crawl under the beams by passing immediately behind a retroreflector. The dimensions of volumes 21 and 22 are determined by the height of the radar antenna, assumed for this figure to be antenna 11, and the distance from the sensor structure 6 to each of the passive retroreflectors 9. The retroreflectors are spaced so that the volumes 21 and 22 have a constant maximum height and thus the spacing between retroreflectors becomes greater as the distance from the sensor structure 6 increases. Ellipses 26 and 27 are identical and represent the cross section of a crawling intruder that can just be detected by a significant reduction in the amplitude of the retroreflected beam, 24 or 25. Point 30 defines the maximum height of ellipse 26. The variables $E_H$ and $E_W$ can be ascribed to the vertical and horizontal dimensions of ellipses 26 and 27, and values can be assumed for these variables that will represent the minimum for any intruder that may be a threat.

FIG. 5 shows the relationship of volumes 21 and 22 and ellipses 26 and 27 to sensor structure 6. The height of antenna 11 above the base 32 of the sensor structure can be defined as variable $A_H$. The distances from the sensor structure to the retroreflectors at locations 28 and 29 can be identified as variables $D_N$ and $D_{N+1}$. A triangle exists in the figure with corners at locations 11, 30, and 31. A similar triangle has corners at 11, 29, and 32. Using principles known to those skilled in the art, these similar triangles yield a relationship $D_{N+1} = (A_H(D_N + E_W))) / (A_H - E_H)$.

For the preferred embodiment of the invention a sample series of calculations can be performed using antenna heights $A_H$ of 1.5 meters for antenna 11 and 3.0 meters for antenna 10; a distance from the sensor structure to the closest retroreflector, $D_N$, of 9 meters; and values for $E_H$ and $E_W$ of 0.25 meters vertical and 0.5 meters horizontal. The following table lists the spacings of the retroreflectors from the sensor structure, as well as the spacing between retroreflectors.

| Antenna height | 1.5 Meters Distance from sensor structure | 1.5 Meters Spacing from previous retroreflector | 3 Meters Distance from sensor structure | 3 Meters Spacing from previous retroreflector |
| --- | --- | --- | --- | --- |
| | 9.00 | | | |
| | 11.10 | 2.10 | | |
| | 13.62 | 2.52 | | |
| | 16.64 | 3.02 | | |
| | 20.27 | 3.63 | | |
| | 24.63 | 4.35 | | |
| | 29.85 | 5.23 | | |
| | 36.12 | 6.27 | | |
| | 43.65 | 7.52 | | |
| | 52.68 | 9.03 | | |
| | 63.51 | 10.84 | | |
| | 76.52 | 13.00 | | |
| | 92.12 | 15.60 | 92.12 | |
| | | | 100.78 | 8.66 |
| | | | 110.22 | 9.44 |
| | | | 120.52 | 10.30 |
| | | | 131.76 | 11.24 |
| | | | 144.03 | 12.26 |
| | | | 157.41 | 13.38 |
| | | | 172.00 | 14.60 |
| | | | 187.93 | 15.93 |
| | | | 205.30 | 17.37 |
| | | | 224.26 | 18.96 |
| | | | 244.94 | 20.68 |
| | | | 267.50 | 22.56 |
| | | | 292.12 | 24.62 |
| | | | 300.00 | 7.88 |

A change over from antenna 11 as the primary beam generator to antenna 10 is assumed at approximately 92 meters. Beams will still be formed between antenna 11 and retroreflectors at ranges greater than 92 meters, but they will extend only a small distance above surface 14. Also, antenna 10 will form beams with all the retroreflectors between the sensor and reflector structures; however, for those retroreflectors located at ranges of less than 92 meters the angle the beams make with surface 14 will be too great to detect intruders represented by ellipses 26 and 27.

With the configuration used to generate the table, twenty-seven passive retroreflectors are positioned along surface 14, including the one at the base of reflector structure 8. The electronic fence can be established over uneven terrain with appropriate adjustments in the spacing of the passive retroreflectors. Complete coverage does require that all points along the surface be within line-of-sight of the emitting and receiving antenna substantially located at the top of the sensor structure.

Those skilled in the art will recognize that other arrangements, positions and combinations of antennas coupled to the sensor structure, other change over points between antennas acting as primary generator of beams, and other placements of passive retroreflectors also fall within the scope of the present invention.

Figure 6:
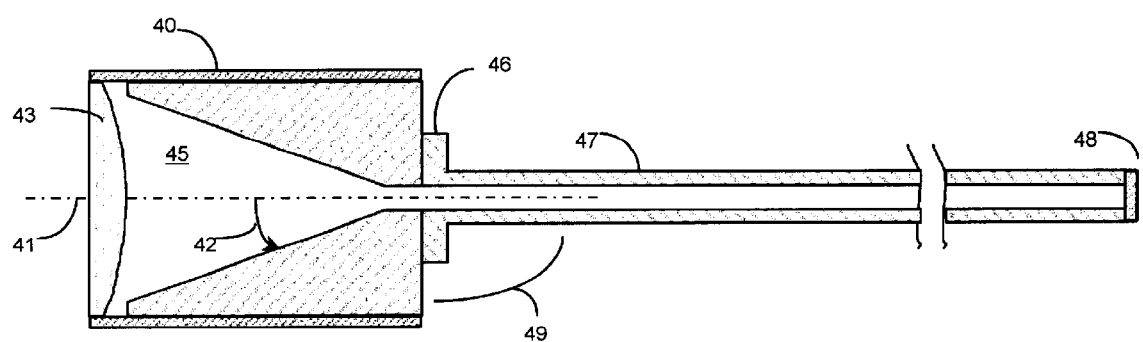
FIG. 6 describes the directional antenna and shorted waveguide assembly that forms a passive retroreflector with greater apparent range than the physical range of the assembly.

The reflector structure 8 of the present invention includes a housing and base essentially identical to that of the sensor structure 6. Included within the reflector structure 8 is a plurality of directional antennas spaced periodically from the bottom to the top of the structure. The reflector structure 8 is positioned to face these antennas toward the sensor structure 6. FIG. 6 is a diagrammatic representation one of these directional antennas 40. Shown is a cross section of the antenna, which is axisymmetric about its centerline 41. A plano-convex, phase correction lens 43, typically constructed of a polypropylene material, reduces the beamwidth for millimeter wave energy entering or emanating from the antenna. The main structure 44 of the antenna is machined or similarly fabricated from a material reflective of millimeter wave energy. A cone shaped cavity 45 collects incoming energy and directs it to the waveguide junction 46 at the peak of the cone.

Each directional antenna 40 is coupled to one end of a circular waveguide 47; the waveguide being terminated by a shorting structure 48 at the end opposite the antenna. The directional antenna and shorted waveguide assembly 49 receives millimeter wave energy from the emitting antenna in the sensor structure 6, propagates this energy through the waveguide 47 to the short 48. Upon propagation, a substantial portion of the energy is reflected back to the antenna 40 to be re-emitted back toward the radar emitting and receiving antenna in the sensor structure 6. The effect of the shorted waveguide 47-48 is to provide a returned signal that appears to emanate from a reflector located at a range greater than the physical location of the reflector structure 8.

The preferred embodiment uses waveguide with air as a dielectric and thus wave propagation within the waveguide substantially the same as that in air, therefore the waveguide length corresponds closely with the apparent greater range of the returned signal. Each of the directional antennas 40 in the reflector structure is coupled to a shorted waveguide 47-48 of different length, thus each directional antenna and shorted waveguide assembly 49 constitutes a reflector at a different apparent range, allowing the sensor structure 6 receiving apparatus to differentiate between the returns from each directional antenna.

Figure 7:
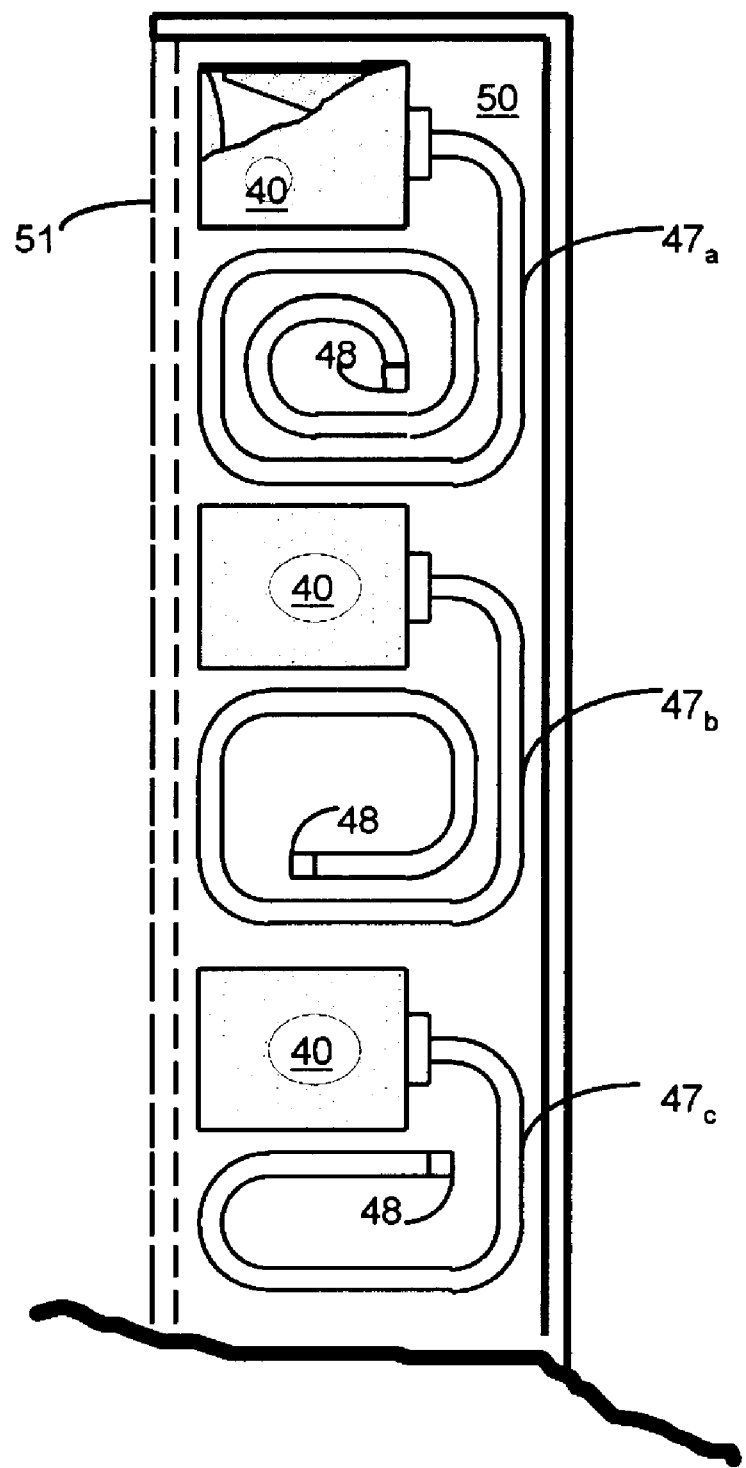
FIG. 7 provides detail of the placement of the directional antenna and shorted waveguide assemblies in the reflector structure.

Five directional antenna and shorted waveguide assemblies 49, of the general structure shown in FIG. 6, are included in the reflector structure 8 of the present invention preferred embodiment. FIG. 7 is an internal view 50 of approximately the upper half of reflector structure 8. Surface 51 is a flat radome-like material that is transparent to millimeter wave energy but opaque in the visible spectrum. This surface prevents a potential intruder from ascertaining the internal construction of the reflector structure and thus the location of the multiple beams. It also provides environmental protection for the components within the structure. The top most directional antenna coupled to its shorted waveguide $47_A$ is placed essentially at the top of the reflector structure and the remaining assemblies are spaced at 0.6-meter intervals down the structure. The longest shorted waveguide $47_A$ is attached to the top antenna, and waveguides $47_B$, $47_C$, and so on, become progressively shorter for the antennas proceeding down the structure.

Although FIG. 6 shows the circular waveguide 47 extending in a straight line away from the directional antenna 40, this waveguide can be turned, or coiled for installation within the reflector structure 8, as shown in FIG. 7. Each directional antenna 40 in the preferred embodiment is characterized by an entrance aperture of some 15.2 centimeters and a 20-degree half cone angle 42. With these dimensions, the directional antenna and shorted waveguide assembly 49 effectively functions as a retroreflector with a radar cross section of some 10 square meters at an operating frequency of 35.5 Gigahertz. A passive retroreflector 9, essentially the same as those positioned along surface 14, is included in the reflector structure 8 and located just above its base to form a beam with a range the same as the physical range of the structure.

The first directional antenna and shorted waveguide assembly 49 above the passive retroreflector has a waveguide with a length of 3 meters. Each higher assembly is characterized by a waveguide that is 3 meters longer than the assembly immediately below. These increasing lengths allow the signal processor in the FM-CW radar included in the sensor structure 6 to discern between the returns from each of these antennas, and thus to form different beams from the radar antenna 10 to each of the five directional antennas in the reflector structure 8. Those skilled in the art will recognize that many other antenna configurations provide equivalent performance and could be used as alternatives to the phase correction lens-cone configuration described herein. Similarly, waveguide structures of different configuration from that described above will provide equivalent performance. Accordingly, the invention is intended to embrace all such alternatives, modifications, and variations as fall within the spirit and broad scope of the appended claims.

The FM-CW radar included in the sensor structure emits and receives the millimeter wave energy that forms the multiple beams making up the electronic fence 7. Processing of the returned energy allows the radar to detect the interruption of any one or more beams and thus identify when an intrusion occurs. Intrusions at close ranges, especially those within region 13 shown in FIG. 3, are detected by the direct return from the intruder's person. Direct or skin returns from intruders at greater ranges are also frequently detected and used to report the range of the intrusion.

Figure 8:
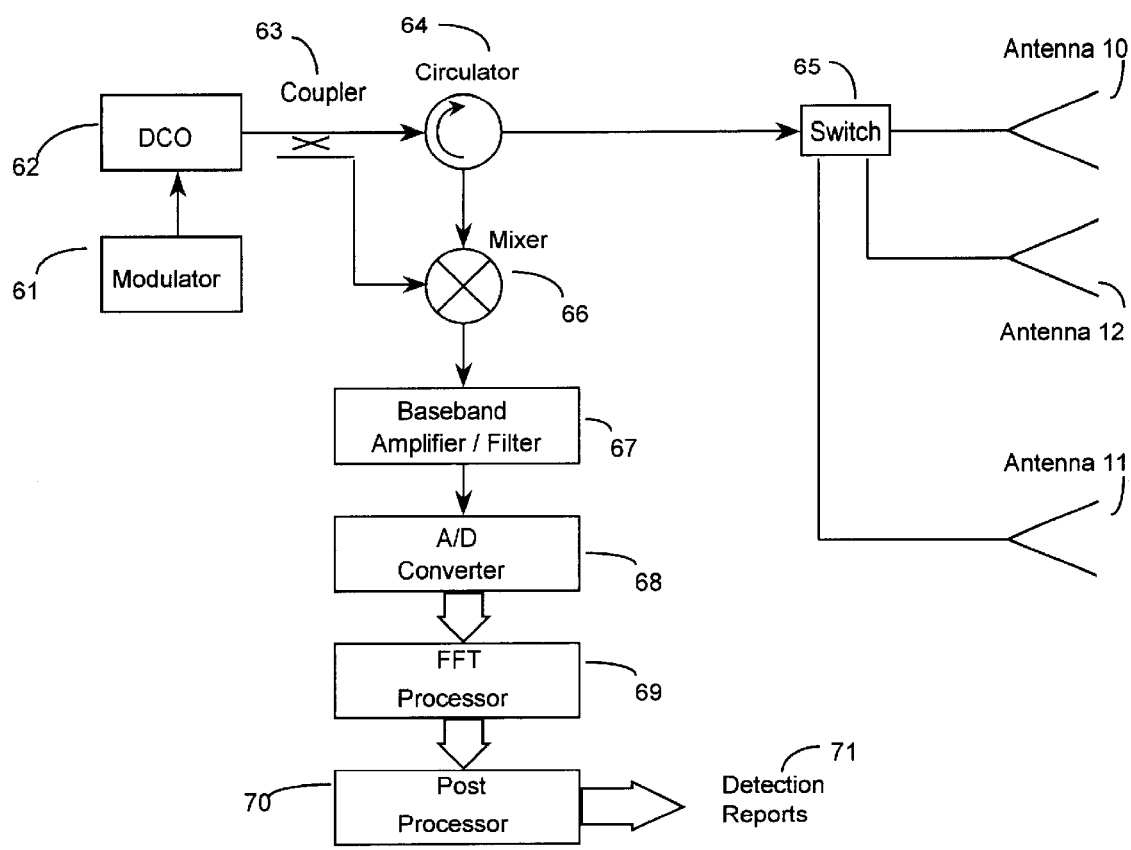
FIG. 8 is a block diagram of the FM-CW radar included within the sensor structure.
Figure 9:
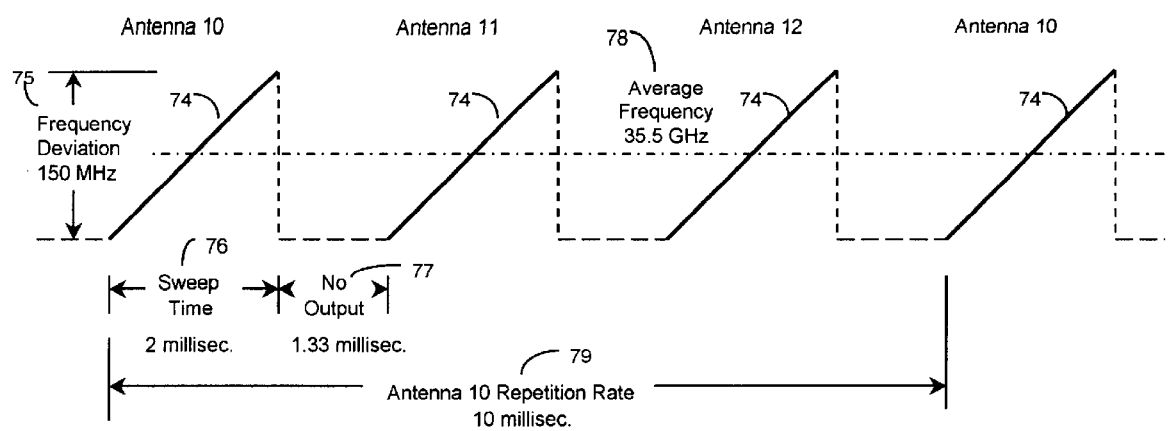
FIG. 9 is a representation of the swept waveform generated by FM-CW radar.

FIG. 8 is a block diagram of the FM-CW radar included in the preferred embodiment of the present invention. The modulator 61 includes digital circuitry that controls the frequency modulation sweep time, frequency deviation, sweep repeat rate, and periods of output of the digitally controlled oscillator (DCO) 62 to form a modified FM-CW modulation pattern. FIG. 9 is a frequency versus time plot of the DCO signal output 74. Shown are four of the continuously repeated frequency sweeps with each characterized by a highly linear positive increase in frequency with time, a frequency deviation 75 of 150 Megahertz, and a sweep time 76 of 2 milliseconds duration. A no signal interval 77 of 1.33 milliseconds exists between successive sweeps. The DCO 62 has a power output of 5 milliwatts at an average frequency 78 of 35.5 Gigahertz.

As shown in FIG. 8, the DCO signal output is passed through the coupler 63 and circulator 64 to the antenna switch 65 where antennas 10, 11, and 12 are coupled to the circulator in sequence so that each antenna is supplied energy every third sweep of the DCO. The sweep rate and antenna switching process results in energy being transmitted for a 2 millisecond period at a 10 millisecond repetition rate 79 for each antenna.

The antennas 10, 11, and 12 receive energy returned from the passive retroreflectors, and also reflected from the person of intruders and from ground clutter near the sensor structure 6. The antennas accomplish emission and reception simultaneously. When an antenna is coupled to the circulator by the antenna switch, the received energy is routed to the mixer 66 by the circulator. The components selected for the preferred embodiment radar provide a transmit-receive isolation of at least 20 dB. The coupler 63 samples a portion of the DCO signal output and supplies it to the mixer where the DCO output sample and the received signal are heterodyned to form a signal with frequency content that is the difference between that of the two mixer inputs. The mixer output ranges in frequency from substantially zero to several hundred kilohertz, referred to as the baseband spectrum by those skilled in the art.

The return from a single target within the range of interest will be a replica of the swept DCO output signal reduced in amplitude and delayed in time in keeping with the known principles of radar. At any point in time, the difference in frequency between the swept transmitted and received signals is a function of their time separation due to target range. The frequency difference, $F_D$, for a fixed position target will remain constant during the entire sweep time. Those skilled in the art will recognize the relationship of the significant parameters to the difference frequency given by $F_D=(2\times R\times \Delta F)/(c\times T_S)$, where R is the range to the target, $\Delta F$ is the frequency deviation, c is the speed of light, and $T_S$ is the sweep time.

Targets at greater ranges produce higher frequency signals, thus the return from the passive retroreflector located at 300 meters will result in a signal with a difference frequency of 150 kilohertz. Each target at a different range will yield a signal component characterized by a frequency in keeping with the relationship above and an amplitude related to its radar cross section and range. The sum of all signals from all targets within the baseband spectrum comprises the main output of the mixer 66 that is supplied to the baseband amplifier/filter 67.

Included within the baseband amplifier/filter 67 is an anti-aliasing filter that suppresses all signals with frequencies greater than 175 kilohertz (equivalent to 350 meters range) to eliminate spurious responses due to large out-of-range targets, unwanted mixing products from the mixer and to prevent spectrum foldover. Also included is a high pass resister-capacitor (RC) network that can be switched in or out of the signal path. This RC network provides attenuation of the returns from retroreflectors at close range, which are characterized by lower frequencies and larger signal amplitudes, with the result that the variation in amplitude of returns over the entire range of operation is reduced. This RC network is switched out of the signal path when processing signals from antenna 12 to allow maximum radar sensitivity for detection of radar returns from intruders at ranges near the sensor structure, such as in region 13. The radar cross section of a human being with typical clothing is in the region of 0.1 square meter and thus presents a much smaller return than the passive retroreflectors. Also included in the baseband amplifier/filter 67 is a low noise amplifier capable of increasing the amplitude of the filtered signal to a level sufficient to meet the input requirements of the analog to digital (A/D) converter 68.

The A/D converter 68 operates at a sample rate of 500 kilohertz, taking samples of the analog signal coming from the baseband amplifier/filter 67 during and slightly after the 2 millisecond sweep time of each DCO output signal. 1024 samples are taken with each sample being converted to a 12 bit digital word. A 1024 bit, real number, Fast Fourier Transform (FFT) processor 69 inputs the succession of 12 bit digital words and produces a digital representation of the input signal spectrum divided into 512 equally spaced frequency bins. Due to the FM-CW radar relationship between target range and frequency, each bin represents a one-meter segment of range, and thus the bins can be referred to as range bins with coverage from one meter out to 512 meters. At the conclusion of each swept DCO output signal period, the amplitude of the digital word in each range bin is a function of the radar cross section of any target at the corresponding range, the $R^{4th}$ radar range law, and the high pass filter effect of the RC circuit in the baseband amplifier/filter 67.

During the 1.33 millisecond no output interval between transmissions, the post processor 70 down loads from the FFT processor 69 the target amplitude data in the range bins of interest, evaluates this data for any beam interruptions and skin returns from intruders, and when intrusions are found relays detection reports 71 to a remote operator. Although the FFT processor generates 512 range bins of data, those representing ranges greater than 325 meters are of no interest when the reflector structure is located at a range of 300 meters. The number of range bins of data down loaded to the post processor and the method of data evaluation varies depending upon the antenna used when generating the data. When antenna 12 is used to search for intruders in region 13, only the data contained within range bins 1 through 13 are down loaded and evaluated. When antenna 10 is used to form multiple beams throughout the length of the electronic fence, data contained within range bins 1 through 325 are down loaded for evaluation. The data derived from antenna 11 may extend over the same range as that for antenna 10, or the range from one meter to approximately 100 meters may be used.

Figure 10:
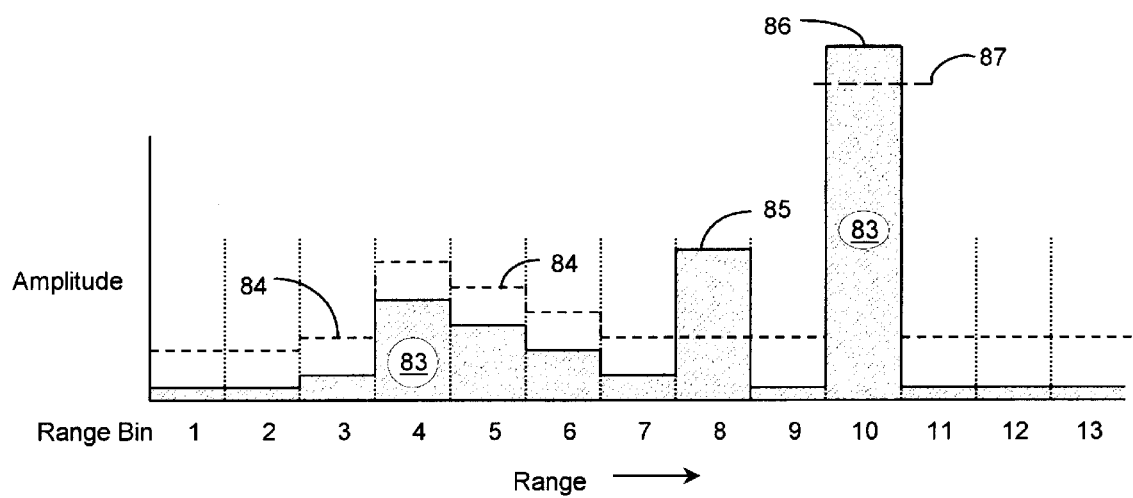
FIG. 10 shows a segment of the FFT processor generated range versus amplitude map for returns near the sensor structure.

FIG. 10 is an example of a range versus amplitude plot of the data derived from the use of antenna 12 when searching for intruders in close proximity to the sensor structure. The amplitude data 83 is plotted for range bins one through 13. In the figure, range bins 1 and 2 have only receiver noise and no radar returns and bin 3 has only a small return since these ranges are less than the separation of antenna 12 from the ground by its mounting location at a height of slightly less than three meters. The radar return shown in range bin 4 has a significant value due to the return from surface 14 which at this range is substantially normal to the impinging radar signal. As the angle to the surface increases, the surface return decreases in range bins 5, 6, and 7. When the radar signal essentially grazes the surface, little return occurs as seen in range bins 11, 12, and 13. The return 85 in range bin 8 is due to an intruder passing through the electronic fence at that range. The return 86 in range bin 10 is from the passive reflector placed at a range of nine meters from the base of the sensor structure, due to the height of the antenna 12 the slant range from antenna to retroreflector is ten meters. Range bins greater by one than a bin containing a target of some physical size may be shadowed by the target have thus have little to no return, for example bin 9.

Shortly after the electronic fence is initially activated, the post processor 70 undergoes a learning mode to determine the normal state with no intruders. During this learning mode, the level in each range bin is measured over sufficient number of samples to determine the average amplitudes of ground clutter returns, retroreflector returns, etc. In FIG. 10 the returns shown in all range bins except bins 8 and 9 typify the levels that can be expected. A threshold 84 is established for each bin that does not contain a retroreflector return; this threshold is sufficiently greater than the average value that during normal operation the signal amplitude in any bin has an extremely low probability of exceeding the threshold if no intruder is present.

For range bins containing retroreflector returns, a second, negative threshold 87 is established at a value sufficiently less than the average value of the retroreflector return to assure no alarms unless the beam to the retroreflector is partially or completely blocked. Periodically the post processor 70 undergoes a brief self-test to reestablish the validity of the threshold values in use. The thresholds 84 and 87 are set close enough to the average values that an intruder cannot pass through the region covered by range bins 1 through 9, or interrupt one of the retroreflector-based beams without detection. In FIG. 10, the intruder skin return is shown exceeding threshold 84 by a significant amount. The post processor generates a detection report 71 each time either threshold is exceeded.

Figure 11:
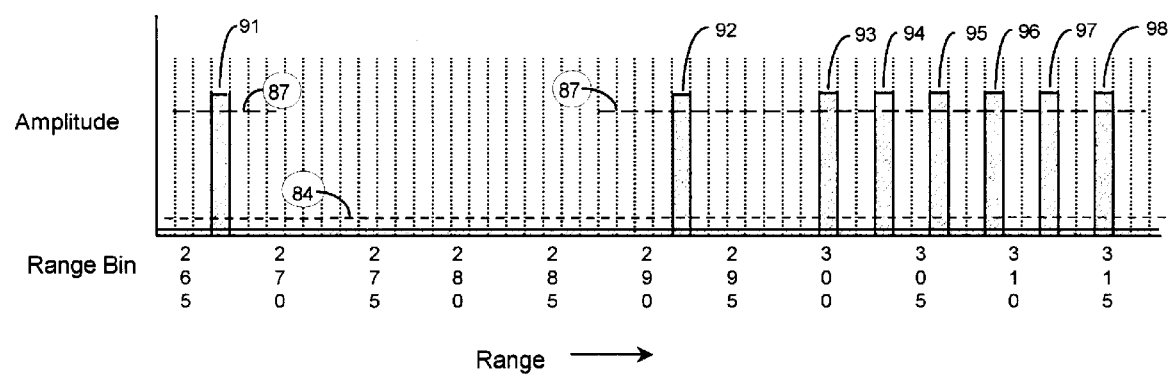
FIG. 11 shows a segment of the FFT processor generated range versus amplitude map for returns near the reflector structure.

FIG. 11 is an example of a range versus amplitude plot of the data derived from the use of antenna 10. This figure covers range bins 264 through 317 which include returns from the reflector structure 8 at the terminal end of the electronic fence 7. Threshold 84 is shown for those range bins that might contain an intruder skin return. Negative threshold 87 is also shown for those range bins containing the returns from passive retroreflectors. Returns 91 and 92 in range bins 267 and 292 are from the retroreflectors located along the surface 14 at those ranges as listed in the table previously described. Return 93 is derived from the passive retroreflector located at the base of the reflector structure 8, substantially at ground level. The reflector structure is positioned at a range of 300 meters from the sensor structure 6. Returns 94 through 98 originate from the five directional antenna and shorted waveguide assemblies 49 included in the reflector structure. The top most directional antenna, which is coupled to the longest shorted waveguide and positioned essentially at the top of the reflector structure, provides return 98 and thus appears to be a target located at a range of 315 meters from the sensor structure.

The remaining assemblies are spaced at 0.6-meter intervals down the structure with each including a shorted waveguide less in length by three meters than that of the assembly above. The result is six separate beams transmitting between the sensor and reflector structures, with a spacing of 0.6 meters between beams at the reflector structure end. The interruption of any one of these beams can be detected by the corresponding signal amplitude dropping below the negative threshold 87. A beam interruption may also be accompanied by the detection of an intruder skin return at some range smaller than the retroreflector location, thus defining the location of the intruder. The post processor 70 compiles the detection data and generates detection report 71 to be provided to a remote operator.

The preferred embodiment of the present invention uses components appropriate for the configuration described herein in keeping with the current state-of-the-art.

Pertinent values include a 5 milliwatt DCO output, a receiver noise figure of 12 dB, and a signal-to-noise ratio of 29 dB for a retroreflector at 300 meters range with an effective radar cross section of 10 square meters. This signal-to-noise ratio provides for the generation of multiple beams with an extremely low false alarm rate while making the passage of an intruder through the electronic fence without detection highly improbable. Those skilled in the art will recognize that many alternate radar configurations using other modulation techniques and methods of target detection having equivalent performance will fall within the broad scope of the present invention.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. An apparatus for detection of any intruder passing through a protected volume, comprising:

a generating means for generating and modulating electromagnetic wave energy;

a focusing means coupled to said generating means for radiating said electromagnetic wave energy into said protected volume;

a collecting means colocated with said focusing means for gathering a portion of said radiated electromagnetic energy;

a plurality of reflectors positioned at separate ranges along the base and distal end of said protected volume for reflecting a portion of said radiated electromagnetic energy, thereby forming an electromagnetic beam between each said reflector and said collecting means, said electromagnetic beam comprising radiated and reflected electromagnetic energy and having a length unique to each said reflector;

a structure located at the proximal end of said protected volume and coupled to both said focusing means and said collecting means for supporting said focusing means and said collecting means at a position or positions above said base of said protected volume for providing line-of-sight propagation of said electromagnetic beams between said focusing means and said collecting means and each of said plurality of reflectors;

a signal processing means coupled to said collecting means and capable of determining the range to objects irradiated by said radiated electromagnetic energy, said signal processing means for monitoring the presence of said electromagnetic beams associated with each said reflector and detecting the physical presence of said intruders within said protected volume;

and an alarm circuit coupled to said signal processing means for generating an alarm when any one or more of said electromagnetic beams are interrupted or when said physical presence of said intruder is detected within said protected volume.

2. An apparatus for detection of any intruder passing through a protected volume, comprising:

a transmitter for generating and modulating electromagnetic wave energy;

an antenna coupled to said transmitter for radiating said electromagnetic wave energy into said protected volume;

a receiver coupled to said antenna for receiving a portion of said radiated electromagnetic energy;

a plurality of reflectors positioned at increasing ranges along the base of said protected volume for reflecting a portion of said radiated electromagnetic energy, thereby forming an electromagnetic beam between each said reflector and said antenna, said electromagnetic beam comprising radiated and reflected electromagnetic energy and having a length unique to each said reflector;

a plurality of reflectors coupled to the tops of support structures forming an array at the distal end of said protected volume with said support structures having increasing height with increasing range from said antenna, each said reflector forming an electromagnetic beam between said reflector and said antenna, said electromagnetic beam having a length unique to each said reflector;

a sensor structure located at the proximal end of said protected volume and coupled to said antenna for supporting said antenna at a position or positions above said base of said protected volume for providing line-of-sight propagation of said electromagnetic beams between said antenna and each of said plurality of reflectors;

an auxiliary antenna coupled to said sensor structure and coupled to said receiver with beamwidth appropriate to detect the physical presence of any said intruder attempting to pass between said sensor structure and the closest said reflector positioned along the base of said protected volume;

a signal processing circuit coupled to said receiver and capable of determining the range to objects irradiated by said radiated electromagnetic energy, said signal processing circuit for monitoring the presence of said electromagnetic beams associated with each said reflector and for detecting the physical presence of said intruders within said protected volume;

and an alarm circuit coupled to said signal processing circuit for generation of an alarm when any one or more of said electromagnetic beams are interrupted or when said physical presence of said intruder is detected within said protected volume, said alarm including range to intruder data.

3. An apparatus as claimed in claim 2, wherein said transmitter generates electromagnetic energy in the millimeter wave region of the electromagnetic spectrum;

and said receiver receives energy in said millimeter wave region of said electromagnetic spectrum.

4. An apparatus as claimed in claim 2, wherein said plurality of reflectors positioned at separate ranges along said base of said protected volume and on said support structures located at the distal end of said protected volume comprise retroreflectors capable of returning substantially all incident electromagnetic energy along a path opposite in direction but parallel to the path of said incident electromagnetic energy;

and said signal processing circuit and said alarm circuit responsive to high signal-to-noise ratio returns from said retroreflectors to provide high probability of detection of any said intruder while providing low probability of false alarm.

5. An apparatus as claimed in claim 2, wherein said antenna is located at a position or positions sufficiently high above said base of said protected volume and wherein said plurality of reflectors are located at positions along said base of said protected area and a portion of said plurality of reflectors are positioned in a vertical arrangement at said distal end of said protected volume, to generate a sufficient number of said electromagnetic beams with beam-to-beam spacing sufficiently small and upper beam height sufficiently high to preclude any said intruder passing between or over said electromagnetic beams without detection.

6. An apparatus for detection of any intruder passing through a protected volume, comprising:

a transmitter for generating and modulating electromagnetic wave energy;

an antenna coupled to said transmitter for radiating said electromagnetic wave energy into said protected volume;

a receiver coupled to said antenna or antennas for receiving a portion of said radiated electromagnetic energy;

a plurality of reflectors positioned at separate ranges along the base of said protected volume for reflecting a portion of said radiated electromagnetic energy, thereby forming an electromagnetic beam between each said reflector and said antenna, said electromagnetic beam comprising radiated and reflected electromagnetic energy and having a length unique to each said reflector;

a plurality of reflectors positioned as a vertical array on a reflector structure located at the distal end of said protected volume with each said reflector capable of reflecting a portion of said radiated electromagnetic energy so that said energy appears to be reflected from an object located at a range that is greater than the physical position of said reflector structure, thereby forming an electromagnetic beam between each said reflector and said antenna consisting of radiated and reflected electromagnetic energy and having a length unique to each said reflector positioned on said reflector structure;

a sensor structure located at the proximal end of said protected volume and coupled to said antenna for supporting said antenna at a position or positions above said base of said protected volume for providing line-of-sight propagation of said electromagnetic beams between said antenna and each of said plurality of reflectors;

an auxiliary antenna coupled to said sensor structure and coupled to said receiver with beamwidth appropriate to detect the physical presence of any said intruder attempting to pass between said sensor structure and the closest said reflector positioned along the base of said protected volume;

a signal processing circuit coupled to said receiver and capable of determining the range to objects irradiated by said radiated electromagnetic energy, said signal processing circuit for monitoring the presence of said electromagnetic beams associated with each said reflector and for detecting the physical presence of said intruders within said protected volume;

and an alarm circuit coupled to said signal processing circuit for generation of an alarm when any one or more of said electromagnetic beams are interrupted or when said physical presence of said intruder is detected within said protected volume, said alarm including range to intruder data.

7. An apparatus as claimed in claim 6, wherein said transmitter generates electromagnetic energy in the millimeter wave region of the electromagnetic spectrum;

and said receiver receives energy in said millimeter wave region of said electromagnetic spectrum.

8. An apparatus as claimed in claim 6, wherein said plurality of reflectors positioned at separate ranges along said base of said protected volume comprise retroreflectors capable of returning substantially all incident electromagnetic energy along a path opposite in direction but parallel to the path of said incident electromagnetic energy;

and said signal processing circuit and said alarm circuit responsive to high signal-to-noise ratio returns from said retroreflectors to provide high probability of detection of any said intruder while providing low probability of false alarm.

9. An apparatus as claimed in claim 6, wherein each of said plurality of reflectors positioned as a vertical array on a reflector structure comprises the an antenna for collecting and reradiating said electromagnetic energy;

a waveguide coupled to said antenna of length related to the difference between said apparent greater distance and said physical distance from said electromagnetic energy source to said apparatus; and a waveguide short coupled to the distal end of said waveguide to reflect substantially all electromagnetic energy arriving at said waveguide short and thus to return said electromagnetic energy to said antenna for reradiation.

10. An apparatus as claimed in claim 6, wherein said antenna is located at a position or positions sufficiently high above said base of said protected volume and wherein said plurality of reflectors are located at positions along said base of said protected area and a portion of said plurality of reflectors are positioned in a vertical arrangement at said distal end of said protected volume, to generate a sufficient number of said electromagnetic beams with beam-to-beam spacing sufficiently small and upper beam height sufficiently high to preclude any said intruder passing between or over said electromagnetic beams without detection.

11. An apparatus for detection of any intruder passing through a protected volume, comprising:

a transmitter for generating and modulating electromagnetic wave energy;

an antenna coupled to the transmitter for radiating the electromagnetic wave energy into the protected volume;

a receiver coupled to the antenna for receiving a portion of the radiated electromagnetic energy;

a plurality of reflectors positioned at increasing ranges along the base of the protected volume for reflecting a portion of the radiated electromagnetic energy, forming an electromagnetic beam between each reflector and the antenna, the electromagnetic beam comprising radiated and reflected electromagnetic energy and having a length unique to each reflector;

a plurality of reflectors coupled to the tops of support structures forming an array at the distal end of the protected volume with the support structures having increasing height with increasing range from the antenna, each reflector forming an electromagnetic beam between the reflector and the antenna, the electromagnetic beam having a length unique to each reflector;

a sensor structure located at the proximal end of the protected volume and coupled to the antenna for supporting the antenna at a position or positions above the base of the protected volume for providing line-of-sight propagation of the electromagnetic beams between the antenna and each of the plurality of reflectors;

an auxiliary antenna coupled to the sensor structure and coupled to the receiver with beamwidth appropriate to detect the physical presence of any the intruder attempting to pass between the sensor structure and the closest the reflector positioned along the base of the protected volume;

a signal processing circuit coupled to the receiver and capable of determining the range to objects irradiated by the radiated electromagnetic energy, the signal processing circuit for monitoring the presence of the electromagnetic beams associated with each reflector and for detecting the physical presence of the intruders within the protected volume; and, an alarm circuit coupled to the signal processing circuit for generation of an alarm when any one or more of the electromagnetic beams are interrupted or when the physical presence of the intruder is detected within the protected volume, the alarm including range to intruder data.

* * * * *